Patented Nov. 28, 1922.

1,436,820

UNITED STATES PATENT OFFICE.

HERMANN PLAUSON, OF HAMBURG, GERMANY.

PROCESS FOR THE MANUFACTURE OF PAINTABLE COMPOSITIONS.

No Drawing. Application filed February 12, 1921. Serial No. 444,487.

*To all whom it may concern:*

Be it known that I, HERMANN PLAUSON, Esthonian subject, residing at Hamburg, Germany, have invented a certain new and useful Process for the Manufacture of Paintable Compositions, of which the following is a specification.

This invention relates to the manufacture of compositions suitable for use as varnishes, lacquers, enamels, or similar fluent compositions consisting of a base incorporated with a liquid medium, which can be applied to surfaces so as to leave a coherent layer of the base, usually after evaporation of the liquid, though in some cases after oxidation or polymerization thereof.

Varnishes or lacquers have hitherto been made by incorporating substances such as natural or artificial resins or like substances, unvulcanized rubber or wax, with a solvent so as to form what is industrially termed a solution. This designation will be retained in the following specification although a refined distinction has been drawn theoretically between what are termed true solutions such as that of certain resins in alcohol, and colloidal solutions of the emulsoid or gel type such as that of rubber in benzene. Since the dissolved substance can be recovered in a soluble form by evaporating the solvent from these latter solutions, they are industrially described as solutions and they behave as such.

On the contrary ordinary pigment paints consist of finely divided solid substances which are held in suspended form in a highly viscous liquid.

The present invention provides a process by which it is possible to obtain varnishes and lacquers, not only from the above substances but also from other substances such as vulcanized rubber as halogen derivatives of rubber, or polymerized vinyl or acrylic esters etc. and it is possible to utilize the above mentioned soluble bases with liquid media in which they are insoluble.

The invention consists in preparing varnish compositions by incorporating the base substance with a suitable liquid so as to form a colloidal solution of the suspensoid type. It must be understood that such a colloidal solution differs from the colloidal solutions of the emulsoid type such as that of unvulcanized rubber in benzene. A typical example of a colloidal solution of the suspensoid type is that of graphite in water; this is really a suspension in which the particles are so exceedingly fine that they are able to resist the action of gravity and consequently do not settle out on standing. On evaporation such suspensoid colloidal solutions yield a residue which is insoluble in the liquid. This is a marked difference from the emulsoid colloids. The distinction may also be expressed by saying that suspensoid colloidal solutions are those in which a solid is very finely divided so as to remain suspended in a liquid which is a non-solvent in the ordinary sense. Hitherto it has not been possible to obtain suspensoid colloid varnishes or the like.

Such varnishes of the suspensoid colloid type comprise a suitable base of colloidal fineness suspended but not dissolved within a suitable liquid and varnish compositions of this type are considered broadly novel together with the hereafter described methods of preparing the same.

When an object is coated with such a suspensoid colloid composition, after evaporation of the liquid which may be termed the dispersion medium, a protective layer is obtained in the same manner as if the base substance had been dissolved in a solvent. It will be seen that broadly the varnishes or the like according to the present invention consist of a base incorporated with a liquid which need not be and usually is not a solvent for the base in the ordinary sense and according to the invention the state of permanent colloidal suspension of the base in the dispersion medium is obtained by mechanical disintegration.

According to the invention therefore the base substance is subjected to highly intensive mechanical disintegration in presence of a liquid dispersion medium so as to form a colloid of the suspensoid type. This process obviously differs from the known emulsification of liquid by other liquids, e. g. oil in water, and it is also different from mastication of bodies such as rubber or waste rubber with a liquid so as to form a homogeneous paste. In the case of such a paste of rubber with a rubber solvent, the rubber is present in the emulsoid or gel form and not in the suspensoid colloid state which can only be obtained when the dispersion medium, i. e. the liquid is a non-solvent which, in ordinary language, does not "dissolve" the rubber.

It has been found that when the usual varnish or the like bases are intensively disintegrated with a sufficient quantity of a suitable organic liquid which need not be a solvent in quantities from 5 to 20 times the amount of the base, a fine dispersion of solid in liquid is obtained which is of the suspensoid colloid type. Suitable disintegrators are extremely high speed disintegrating apparatus of the beater type or the colloid mill described in my co-pending application Serial No. 437,117. For brevity I will refer to a colloid mill as comprising a high speed disintegrator in which the peripheral velocity is about 2000 metres per minute.

Suitable bases are natural or artificial resins or resinous material such as polymerized vinyl compounds or acrylic acids or acrylic esters in the polymerized form, phenol-formaldehyde resins or their condensation products with other organic substances, for instance with organic acids, terpenes, cumarone, indene, etc., or more or less soluble or vulcanized natural or artificial rubber.

It is convenient to add from 1 to 5% of a solvent or a swelling agent for the base or a reagent which accelerates dispersion, raises the homogeniety of the varnish compositions and increases its life on storage i. e. prevents settling of the base. Suitable agents of this type will be described hereafter but first it will be convenient to give examples of suitable dispersion media. The following liquids may be used, for example, benzine, benzene and its homologues and mixtures thereof having a boiling point of up to 200° C., terpenes having a boiling point up to 200° C., chlorhydrins especially dichlorhydrin and epichlorhydrin, chlorinated hydrocarbons, (boiling point up to 200° C.) ketones or condensation products thereof, (boiling point up to 200° C.) esters or organic acids (boiling point up to 200° C.) also alcohols (boiling point up to 135° C.) oxidized or sulphonated vegetable or animal oils, mineral, gas or tar oils, or mixtures of various of these dispersion media. It will be obvious therefore that the properties of the varnish compositions can be varied at will by suitable choice of base and dispersion medium.

Neutral colour materials of inorganic or organic nature can be added before or during treatment so as to obtain paints in the form of coloured varnishes.

As regards the substances which accelerate dispersion, the following may be mentioned and small quantities may be used:—
Ammonia or its organic derivatives, oil soluble alkaline earth alkaline or metal soaps such as oleates or resinates or naphthenates, sulphonated oils, phenols napthene-disulphonic acids, and aniline, toluidine xylidine, nitrobenzene, etc. These agents appear to behave as protective colloids for the suspensoid colloid formed and prevent precipitation of the base.

Certain of the above mentioned substances have already been employed for the purpose of emulsifying oil in water or like uses but their use in the preparation of suspensoid colloidal varnish compositions is novel since these compositions have hitherto not been known.

Successful disintegration according to the present invention is only possible when the disintegrator is operated at high speed. Suspension gradually begins at a peripheral speed of about 300 metres per minute, but is only practicable from an economic standpoint at a peripheral speed of about 1500 to 2500 metres per minute. Consequently the ordinary type of grinding mill or agitating apparatus cannot be used, for example such apparatus as are used to obtain emulsions. The invention will be understood by a consideration of the following examples.

*Example 1.*

Manufacture of a varnish from ebonite or soft rubber waste, 5 to 10 parts of ebonite dust or powder are stirred into a mixture of 100 parts of xylene and 3 parts of limonene (dipentene and turpentine) and 1 to 3 parts of ammonia soap from olein and the mixture is treated for from 1 to 5 hours in a high speed disintegrator or colloid mill according to the fineness of the ebonite powder used. Finely divided soft vulcanized rubber can also be used instead of the ebonite. The ground liquid mixture runs into a reservoir from which it is continuously returned to the disintegrator through a pump. The reservoir and the liquid are heated to 100 to 120° C. preferably by steam but this is not absolutely necessary. The ebonite powder is "dispersed" to a large extent at ordinary temperatures but the time of dispersion under otherwise equal conditions can be reduced by more than one half by heating. Even without heating the whole of the ebonite powder has disappeared after 2 to 5 hours as if it has been dissolved in a solvent.

A thin mobile completely homogeneous liquid is formed which can be painted on to a surface when a solid lacquer-like layer is obtained after drying which on heating becomes firm and hard like a thin ebonite layer.

If soft rubber is used instead or ebonite, a rubber-like more or less soft layer is obtained. The properties of the lacquer can be varied by suitable admixture of ebonite and soft rubber with or without addition of natural or artificial rubber or sulphur. Obviously other additions such as natural or artificial resins, asphalt, pitch or the like can be used to impart the desired properties to the varnish, for instance to increase its insulating power or to cheapen it. To thicken the varnish for certain purposes, for instance as an adhesive, more than half the dispersion medium can be removed by distillation in vacuo at not over 50 to 60° C.

The addition of the ammonia soap can be omitted and 3 to 5% of a rubber solvent can be added which also possesses the property of dissolving or combining with sulphur e. g. pseudocumene, sulphonated oils, tar oils, phenols, aniline, xylidine, hydrocarbons etc. Other compounds of the benzene series or of the paraffin series can be employed as dispersion media. Also chlorinated hydrocarbons are very suitable. The choice of the dispersion medium depends chiefly on the requirements of safety against fire or on the volatility etc., of the liquid and the properties of the varnish can be varied by suitable choice of the dispersion medium.

The process can be modified by first treating the varnish or the like base with small quantities of a solvent or swelling agent (i. e. a substance which transforms a body such as rubber into the gel form) and preferably working on rollers and then treating the mixture in the disintegrator with the necessary quantity of dispersion medium. This modification can be used to shorten the working time and thus effect a considerable saving of energy. Ebonite or soft rubber waste with mineral additions can be subjected to the same treatment and yet give useful varnishes. These additions separate from the finished varnish on standing and can be separated therefrom in many cases.

Other substances can be employed as bases for instance resins, asphalts, pitches, formaldehyde condensation products, vinyl polymerization products, or the like.

*Example 2.*

100 parts of benzene are mixed with 5 to 10 parts of acetone-soluble phenol-formaldehyde condensation products which may be previously treated with small quantities of acetone or the like for the purpose of swelling in presence of 1 to 5% of colophony (or a fossil resin) and the mixture disintegrated as in Example 1 for about three hours at a temperature not over 70° C. preferably at 50° C. when a homogeneous lacquer is obtained which is not a true solution of the base in benzene but is a suspensoid colloidal dispersion thereof.

A varnish like shellac can also be obtained with other artificial resins such as oxidized pitches, cumarone resins, vinyl polymerization products, acylic acid esters etc. or natural resins such as copal, elemi mastic asphalt colophony etc. Alcohol, phenol or the like can be employed as swelling agent and colophony as protective colloid. Chlorinated hydrocarbons are particularly suitable as dispersion media. In many cases especially when using ebonite or soft rubber as the varnish base, the degree of dispersion which is obtainable is not homogeneous so that the base is partly in the highly dispersed form, but partly in a much coarser form. A long time would be required to make the whole base sufficiently fine and this would not be economical. In such cases the coarser parts can be separated out by standing for about 24 hours when a useful varnish is obtained by decanting or filtering off the clear layer. Or the mixture can be centrifugalized at a suitable number of revolutions when the coarser particles are separated. Such varnishes keep very well and are excellent in use. The coarser separated particles can be employed for making further quantities of varnish by further treatment. It should also be added that if temperatures above 50° C. are employed the disintegration must be continued until the temperature falls to 25 to 30° C. If these artifices are not employed it is difficult to obtain varnishes which retain their homogeneity on long storage.

It will be seen that in any case the products obtained according to the present invention are varnish compositions of a new type, viz. the suspensoid colloid type. They differ from ordinary varnishes in that the particles are so finely divided that they posses the power of remaining in permanent colloidal suspension.

They differ from ordinary varnishes which may be regarded as true solutions and they differ from what are technically termed "solutions" of soft vulcanized rubber in solvents by the fact that although these latter are theoretically to be considered colloidal solutions, yet in practice they are considered and behave as ordinary solutions. The products according to the present invention are referred to as suspensoid colloids for the purpose of distinguishing them from the technical "solutions" of unvulcanized rubber or similar products.

I declare that what I claim is:—

1. A process of preparing varnish compositions by subjecting a mixture of a varnish base and a liquid dispersion medium to such intensive mechanical high speed disintegration that a colloidal solution of the suspensoid type is obtained.

2. A process of obtaining varnish compositions which comprises subjecting a mixture of a varnish base and a large quantity of a liquid dispersion medium to a mechanical disintegration at a peripheral speed of about 2000 meters per minute or over.

3. A process of preparing varnish compositions which consists in subjecting a mixture of a varnish base, a liquid dispersion medium and a dispersion accelerator to intensive mechanical disintegration.

4. A process of preparing varnish compositions which consists in subjecting a mixture of a varnish base and a liquid dispersion medium which is a non-solvent for said base to intensive high speed mechanical disintegration so that the colloidal solution of the suspensoid type is obtained.

5. A process of obtaining varnish compositions which consists in subjecting a mixture of a base, a non-solvent liquid and a quantity of a solvent for said base to such intensive mechanical disintegration that a colloidal solution of the suspensoid type is obtained.

6. A process of obtaining a varnish paint composition which consists in subjecting a mixture of a varnish base and a liquid dispersion medium, to intensive mechanical disintegration to obtain a colloidal solution of the suspensoid type and then thickening the composition by distilling off part of the liquid in vacuo at a low temperature.

7. A process of preparing varnish compositions which consists in treating a suitable varnish base with a small quantity of a liquid having solvent properties and then intensively mechanically disintegrating a mixture of the composition thus obtained with a large quantity of a non-solvent liquid until a colloidal solution of the suspensoid type is obtained.

8. A process of obtaining varnishes by subjecting a mixture of a varnish base with a liquid dispersion medium which is substantially a non-solvent therefor, to such intensive mechanical high speed disintegration that a colloidal solution of the suspensoid type is obtained.

9. A process of obtaining varnish by subjecting a mixture of a varnish base with from five to twenty times its weight of a liquid dispersion medium which is a non-solvent therefor, to such intensive mechanical disintegration that a colloidal solution of the suspensoid type is obtained.

In witness whereof, I have hereunto signed my name this 30 day of Decr. 1920, in the presence of two subscribing witnesses.

HERMANN PLAUSON.

Witnesses:
J. VICTOR BURNSTINE,
W. H. BEESTON.